United States Patent [19]

Soga et al.

[11] Patent Number: 5,293,209
[45] Date of Patent: Mar. 8, 1994

[54] ELECTROPHOTOGRAPHIC APPARATUS CONTAINING A CHEMICAL ADSORPTION FILM COATING

[75] Inventors: Mamoru Soga, Osaka; Norihisa Mino, Settu; Kazufumi Ogawa, Hirakata, all of Japan

[73] Assignee: Matsushita Electric Industrial Co., Ltd., Osaka, Japan

[21] Appl. No.: 914,534

[22] Filed: Jul. 17, 1992

[30] Foreign Application Priority Data

| Jul. 22, 1991 | [JP] | Japan | 3-180792 |
| Aug. 28, 1991 | [JP] | Japan | 3-217611 |
| Aug. 28, 1991 | [JP] | Japan | 3-217612 |
| Apr. 22, 1992 | [JP] | Japan | 4-103194 |
| Apr. 22, 1992 | [JP] | Japan | 4-103195 |
| Apr. 22, 1992 | [JP] | Japan | 4-103196 |

[51] Int. Cl.$^5$ .................. G03G 15/00; G03G 21/00
[52] U.S. Cl. .................. 355/200; 355/284; 355/296; 430/66
[58] Field of Search ............ 355/200, 210, 219, 282, 355/284, 296; 430/66, 67, 124, 125

[56] References Cited

U.S. PATENT DOCUMENTS

| 4,188,423 | 2/1980 | Swift | 29/132 X |
| 4,375,505 | 3/1983 | Newkirk | 430/99 |
| 4,853,737 | 8/1989 | Hartley et al. | 355/289 |
| 4,997,738 | 3/1991 | Kumakura et al. | 430/67 |
| 5,035,927 | 7/1991 | Chen et al. | 430/99 X |
| 5,141,788 | 8/1992 | Badesha et al. | 355/289 X |
| 5,157,445 | 10/1992 | Shoji et al. | 355/284 |

FOREIGN PATENT DOCUMENTS 2577696  8/1986  France .

OTHER PUBLICATIONS

Patent Abstracts of Japan, vol. 11, No. 35 (P-542)(2482) Feb. 3, 1987 (JP-A-61 205 950 (Canon Inc) Sep. 12, 1986).
Patent Abstracts of Japan, vol. 006, No. 005 (P-097) Jan. 13, 1982 (JP-A-56 132 368 (Canon Inc.) Oct. 16, 1981).
Database WPI, Week 8304, Derwent Publications Ltd., London, GB: AN 83-08313K (4) (JP-A-57 201 276 (Fuji Xerox K.K.) Dec. 9, 1982).

*Primary Examiner*—Fred L. Braun
*Attorney, Agent, or Firm*—Fish & Richardson

[57] ABSTRACT

A chemical adsorption film possessing a fluorocarbon group through siloxane coupling is applied on the surface of a photoimaging component such as a photoconductor, the surface of a cleaning blade, the surface of a fixing roller, the surface of a separation pawl used in offset of paper, the surface of a corona wire, or the surface of a corona grid. Further according to the invention, the chemical adsorption film is laminated via a siloxanebased inner layer, the inner layer being bonded by covalent bonds to the surface of the device, the inner layer and the chemical adsorption film being bonded together by covalent bonds. Furthermore according to the invention, since the chemical adsorption film of the invention is an ultrathin film, on the order of nanometers or Angstroms, it does not spoil the properties of the separation pawl such as mechanical strength.

14 Claims, 4 Drawing Sheets

ELECTROPHOTOGRAPHIC APPARATUS CONTAINING A CHEMICAL ADSORPTION FILM COATING

FIELD OF THE PRESENT INVENTION

This invention relates to an electrophotographic apparatus. More particularly to a surface of a photoimaging component such as a photoconductor, cleaning blade, fixing roller, separation pawl, corona wire and corona grid etc.

BACKGROUND OF THE INVENTION

In an electrophotographic apparatus, the photoreceptor is used in a series of electrophotographic processes; that is, in repetitive processes of primary charging, forming of an electrostatic latent image by image exposure, development of toner charged in reverse polarity of the electrostatic image, transfer of the toner image on plain paper, removal of residual toner on the drum by a cleaning device, and removal of electric charge on the drum by intense exposure.

In these processes, the talc and residual toner of the paper on the photoconductor drum are usually removed by using a cleaning roller or cleaning blade.

The required characteristics of the blade are to remove the toner efficiently from the photoconductor drum and to prevent the removed toner from depositing on the blade.

As the blade material, polyurethane rubber is generally used because it is excellent in wear resistance.

In the fixing process, the toner is permanently adhered to the paper by heat or pressure. The fixing process is the step for determining the final image. When the adhesion of the toner and the roller surface becomes stronger than the aggregation of toner particles, the toner deposits on the roller, which causes background noise on the copy. That is, the toner is stuck on the white background. To prevent this, the roller surface is coated with polytetrafluoroethylene to weaken toner adhesion.

In the fixing process, in order to improve the paper offset property, the separation pawl is used. To prevent the toner from sticking to the separation pawl, the surface of the separation pawl made of polyamide is coated with a resin containing fluorine, and is baked (Japanese Patent Publication Sho. 61-23554).

In the corona charging process, the photoconductor surface is uniformly charged by corona discharge by means of a corona wire. The corona wire is usually made of gold-coated tungsten wire.

Also in the fixing process, the photoconductor surface is uniformly charged by corona discharge by means of a charger. The corona grid is generally made of stainless steel.

If an attempt is made to remove the toner in this method, however, a slight amount of paper talc and toner is not removed but is left on the photoconductor drum. When the image is repeatedly formed, white blanks or black spots may appear on the image and lower the image quality. Or if the cleaning roller or cleaning blade is applied by force in order to remove toner, the electric charge of the surface layer of the photoconductor is charged which lowers the durability.

Moreover, if fixed repeatedly by using a fixing roller, the toner is deposited on the roller surface, and black spots appear on the image if the images are formed repeatedly, and the image quality drops. This is because, due to repeated fixings, the Teflon ("Teflon" is the trademark for polytetrafluoroethylene) coated surface is injured or is partly torn, and the toner parting property is lowered.

In the conventional separation pawl, if used repeatedly at 200° C. or more, the fluorine-containing resin film may be injured or partly torn, and the toner parting property is lowered which impairs the image quality.

By repeating the charging process in the electrophotographic apparatus using a charger, the toner deposits on the corona wire, and when the images are formed repeatedly, image disturbance or black spots may appear on the image which lowers the image quality. This is because the corona wire is not provided with the toner parting property.

Also by repeating the charging process in the electrophotographic apparatus using such charger, the toner deposits on the corona grid, and when images are formed repeatedly, image disturbances or black spots may appear on the image which lowers the image quality. This is because the corona grid is not provided with the toner parting property.

SUMMARY OF THE INVENTION

The invention is devised in light of the above problems, and it is hence a primary object to present an electrophotographic apparatus which is excellent in image quality.

According to a first aspect of the invention we provide an electrophotographic apparatus for obtaining duplicate images comprising a photoimaging component coated with a chemical adsorption film containing a fluorocarbon group, the chemical adsorption film bonded through —SiO— covalent bonds.

It is preferable in this invention that the component is selected from the group consisting of a photoconductor, cleaning blade, fixing roller, separation pawl, corona wire and corona grid.

It is preferable in this invention that the chemical adsorption film is a monomolecular film or a polymer film.

It is preferable in this invention that the component comprises a substrate made of a material selected from the group consisting of metals, metal oxide, ceramics, glass, plastics.

It is preferable in this invention that the component comprises a substrate surface having at least one functional group selected from the group consisting of a hydroxyl group, carboxyl group, an imino group and an amino group.

It is preferable in this invention that the component comprises a plasma or corona treated substrate surface.

It is preferable in this invention that the chemical adsorption film is laminated via a siloxane-based inner layer, the inner layer being bonded by covalent bonds to a surface of the device, the inner layer and the chemical adsorption film being bonded together by covalent bonds.

It is preferable in this invention that the inner layer is a monomolecular film or polymer film.

According to the invention, the photoreceptor used in the electrophotographic apparatus of the invention has its surface coated with a chemical adsorption film possessing a fluorocarbon group by chemical bonding through siloxane coupling, and is hence excellent in protection from contamination. That is, since the fluorocarbon group is present in the surface layer of the chemical adsorption film, the anti-fouling property is excellent, and the toner does not deposit on the uncharged portion, and the talc and toner of the paper may be easily removed at the time of cleaning. Since the base of the chemical adsorption film is formed by chemical bonding through siloxane coupling, the film is excellent in durability, and if the surface is cleaned repeatedly, the chemical adsorption film will not be easily separated from the photoconductor surface. Furthermore, the chemical adsorption film of the invention is ultrathin, on the order of nanometers or Angstroms, and therefore it will not spoil the characteristics of the photoconductor surface such as mechanical strength.

Furthermore, according to a preferred embodiment of the invention in which the chemical adsorption film is a monomolecular film, since a thin film of uniform thickness is formed, it does not affect the dimensional precision of the photoconductor.

A preferred second aspect of the invention for achieving the above object presents an electrophotographic apparatus for obtaining duplicate images, wherein a chemical adsorption film possessing a fluorocarbon group through siloxane coupling is applied on the surface of the cleaning blade.

In this embodiment, the chemical adsorption film is desirably a monomolecular film.

The cleaning blade used in the electrophotographic apparatus of the invention has its surface coated with a chemical adsorption film possessing a fluorocarbon group by chemical bonding through siloxane coupling, and therefore it provides excellent lubrication and prevents contamination. That is, since the fluorocarbon group is present in the surface layer of the chemical adsorption film, it provides excellent lubrication and prevents contamination. Besides, since the base of the chemical adsorption film is formed by chemical bonding through siloxane coupling, the film is excellent in durability, and therefore if the surface is rubbed repeatedly, the chemical adsorption film will not be easily separated from the cleaning blade surface. Furthermore, since the chemical adsorption film of the invention is an ultrathin film, on the order of nanometers or Angstroms, it does not spoil the properties of the cleaning blade such as mechanical strength.

Moreover, since the chemical adsorption film is a monomolecular film in a preferred embodiment of the invention, a thin film of uniform thickness is obtained, so that it does not affect the dimensional precision of the cleaning blade.

A preferred third embodiment presents an electrophotographic apparatus for obtaining duplicate images, wherein the chemical adsorption film possessing a fluorocarbon group through siloxane coupling is applied on the surface of a fixing roller.

In this embodiment, the chemical adsorption film is desired to be a monomolecular film.

The fixing roller used in the electrophotographic apparatus of the invention has its surface coated with a chemical adsorption film possessing a fluorocarbon group by chemical bonding through siloxane coupling, and therefore it is excellent separating property. That is, since the fluorocarbon group is present in the surface layer of the chemical adsorption film, it is excellent separating property. Besides, since the base of the chemical adsorption film is formed by chemical bonding through siloxane coupling, a film excellent in durability is obtained, and if the surface is rubbed repeatedly, the chemical adsorption film will not be easily peeled off the surface of the fixing roller. In addition, since the chemical adsorption film of the invention is an ultrathin film, on the order of nanometers or Angstroms, it does not spoil the characteristics of the fixing roller such as mechanical strength.

In a preferred embodiment of the invention in which the chemical adsorption film is a monomolecular film, a thin film of uniform thickness is obtained, and it does not affect the dimensional precision of the fixing roller.

To achieve the above objects, the invention presents an electrophotographic apparatus for obtaining duplicate images, wherein the chemical adsorption film possessing a fluorocarbon group through siloxane coupling is applied on the surface of a separation pawl used in the paper offset.

In this embodiment, the chemical adsorption film is desired to be a monomolecular film.

The separation pawl used in the electrophotographic apparatus of the invention has its surface coated with a chemical adsorption film possessing a fluorocarbon group by chemical bonding through siloxane coupling, and hence it is excellent separating property. That is, since the fluorocarbon group is present in the surface layer of the chemical adsorption film, it is excellent in parting property, and the toner does not deposit on the surface. Besides, the base of the chemical adsorption film is formed by chemical bonding through siloxane coupling, and hence the film is excellent in durability, and if the surface is rubbed repeatedly, the chemical adsorption film will not be easily peeled off the surface of the separation pawl. Furthermore, since the chemical adsorption film of the invention is an ultrathin film, on the order of nanometers or Angstroms, it does not spoil the properties of the separation pawl such as mechanical strength.

Still more, in a preferred constitution of the invention in which the chemical adsorption film is a monomolecular film, since a thin film of uniform thickness is obtained, it does not affect the dimensional precision of the separation pawl.

A preferred fifth embodiment presents an electrophotographic apparatus for obtaining duplicate images, wherein the chemical adsorption film possessing a fluorocarbon group through siloxane coupling is applied on the surface of a corona wire.

In the above embodiment, the chemical adsorption film is desired to be a monomolecular film.

The corona wire used in the electrophotographic apparatus of the invention has its surface coated with a chemical adsorption film possessing a fluorocarbon group by chemical bonding through siloxane coupling, and hence it is excellent in parting property. That is, since the fluorocarbon group is present in the surface layer of the chemical adsorption film, the separating property is excellent. Besides, since the base of the chemical adsorption film is formed by chemical bonding through siloxane coupling, the film is excellent also in durability, and if charged repeatedly, the chemical adsorption film will not be easily peeled off the surface of the corona wire. In addition, since the chemical adsorption film of the invention is an ultrathin film, on the order of nanometers or Angstroms, it does not spoil the characteristics of the corona wire such as mechanical strength.

In a preferred embodiment of the invention in which the chemical adsorption film is a monomolecular film, a thin film of uniform thickness is obtained, so that it does not affect the dimensional precision of the corona wire.

A preferred sixth embodiment presents an electrophotographic apparatus for obtaining duplicate images, wherein a chemical adsorption film possessing a fluorocarbon group through siloxane coupling is applied on the surface of a corona grid.

In this embodiment, the chemical adsorption film is desired to be a monomolecular film.

The corona grid used in the electrophotographic apparatus of the invention has its surface coated with a chemical adsorption film possessing a fluorocarbon group by chemical bonding through siloxane coupling, and therefore it is excellent separating property. That is, since the alkyl fluoride group is present in the surface layer of the chemical adsorption film, the separating property is excellent. Besides, since the base of the chemical adsorption film is formed by chemical bonding through siloxane coupling, the film also excels in durability, and if charged repeatedly, the chemical adsorption film will not be easily peeled off the corona grid. Moreover, since the chemical adsorption film of the invention is an ultrathin film, on the order of nanometers or Angstroms, it does not spoil the properties of the corona grid such as mechanical strength.

In a preferred embodiments of the invention in which the chemical adsorption film is a monomolecular film, a thin film in uniform thickness is formed, and therefore it does not affect the dimensional precision of the corona grid.

In the first to sixth embodiments, the chemical adsorption film may be replaced by a polymer film. By forming a polymer film, the film is dense and it is excellent in durability and other properties.

DETAILED DESCRIPTION OF THE INVENTION

The invention is described in detail below by reference to the illustrated embodiments thereof.

Figure 1:
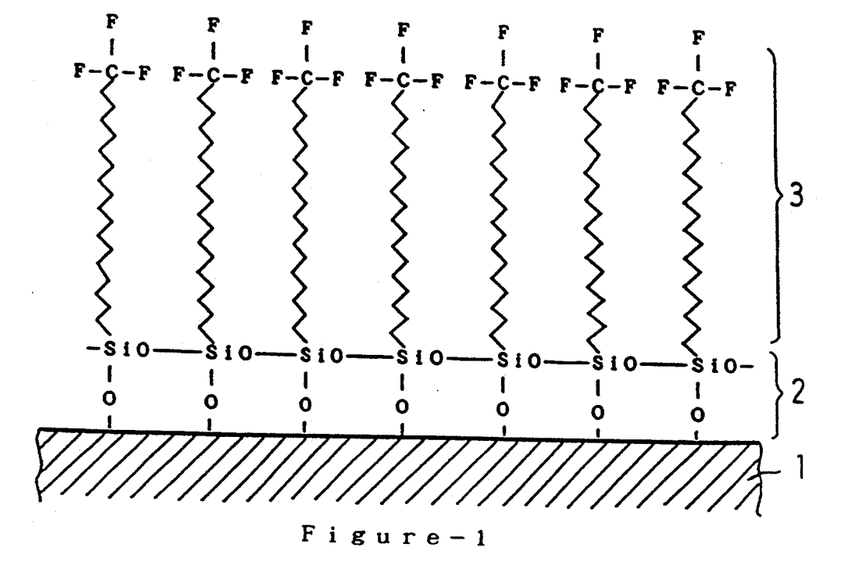
FIG. 1 is a sectional conceptual diagram magnifying the surface of an electrophotographic photoconductor used in an electrophotographic apparatus of the invention from a molecular level.

A first embodiment of the electrophotographic apparatus of the invention employs, as shown in FIG. 1, an electrophotographic photoreceptor 1 having its surface coated with a monomolecular film 3 possessing a fluorocarbon group through a siloxane coupling 2.

The materials for the electrophotographic photoconductor may include, as examples of inorganic photoconductor, amorphous silicon, mixture of amorphous Se and $As_2Se_3$, CdS and others.

Examples of an organic photoconductor may include, for the carrier generating layer (CGL), PVK, perylene pigment, indigo, bisazo pigment, chlorodian blue, etc. and for the carrier transfer layer (CTL), triphenylamine dimer, pyrazoline derivative, triphenylamine derivative, hydrazone derivative, oxadiazole derivative, and indolin derivative. These organic photoconductors are mainly used in a state being dispersed in a resin.

The chemical adsorption film applied on the surface of the photoconductor used in the electrophotographic apparatus of the invention is composed of a chlorosilane surface active agent possessing an alkyl fluoride group.

Figure 2:
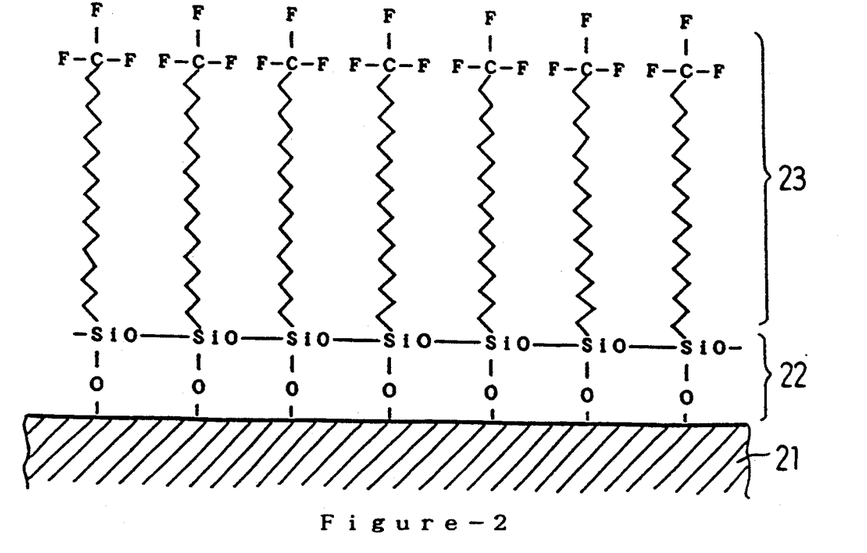
FIG. 2 is a sectional conceptual diagram magnifying the surface of a cleaning blade used in an electrophotographic apparatus of the invention from a molecular level.

A second embodiment of the electrophotographic apparatus of the invention comprises, as shown in FIG. 2, a cleaning blade 21 having its surface coated with a monomolecular film possessing a fluorocarbon group through a siloxane coupling 22.

As the material for the cleaning blade, for example, rubber materials, in particular, polyurethane rubber materials are widely used.

Figure 3:
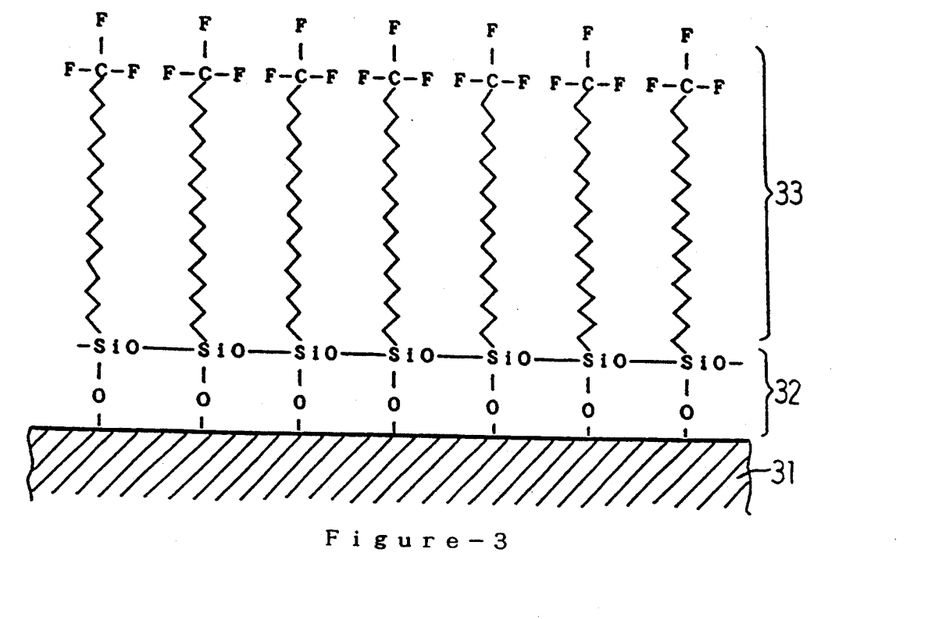
FIG. 3 is a sectional conceptual diagram magnifying the surface of a fixing roller used in an electrophotographic apparatus of the invention from a molecular level.

A third embodiment of the electrophotographic apparatus of the invention comprises, as shown in FIG. 3, a fixing roller 31 having its surface coated with a monomolecular film 33 possessing a fluorocarbon group through a siloxane coupling 32.

As the material for the fixing roller, for example, metal is widely used, in particular, aluminum.

The chemical adsorption film applied on the surface of the fixing roller used in the electrophotographic apparatus of the invention is composed of a chlorosilane surface active agent possessing a fluorocarbon group.

Figure 4:
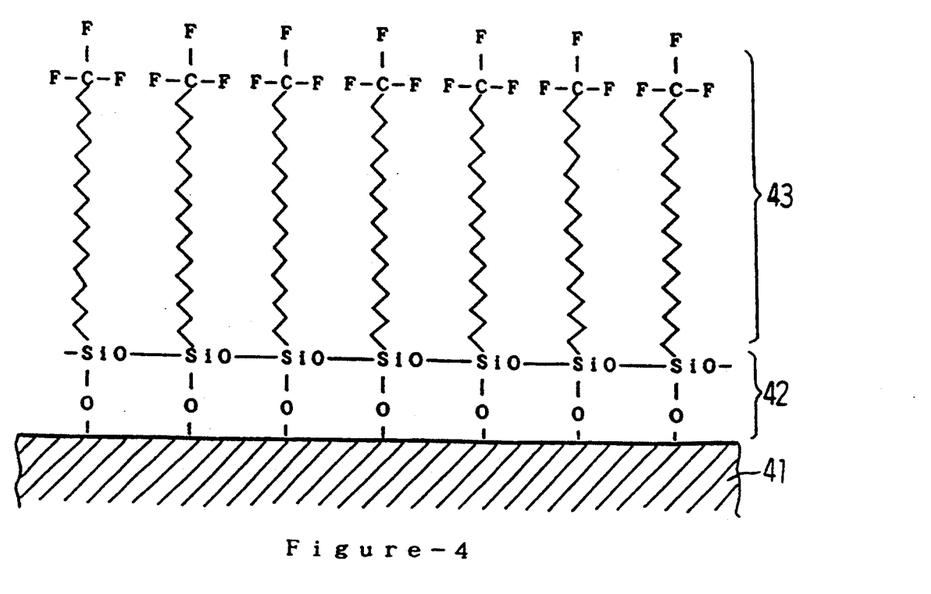
FIG. 4 is a sectional conceptual diagram magnifying the surface of a separation pawl used in an electrophotograhic apparatus of the invention from a molecular level.

A fourth embodiment of the electrophotographic apparatus of the invention comprises, as shown in FIG. 4, a separation pawl 41 having its surface coated with a monomolecular film 43 possessing a fluorocarbon group through a silocane coupling 42.

Materials for the separation pawl include heat resistant resins such as polyamide, polyimide, nylon, PET, PBT, polyacetal, polycarbonate, polyarylate, polypropylene polyethylene, and ABS.

The chemical adsorption film applied on the surface of the separation pawl used in the electrophotographic apparatus of the invention is composed of a chlorosilane surface active agent possessing a fluorocarbon group.

Figure 5:
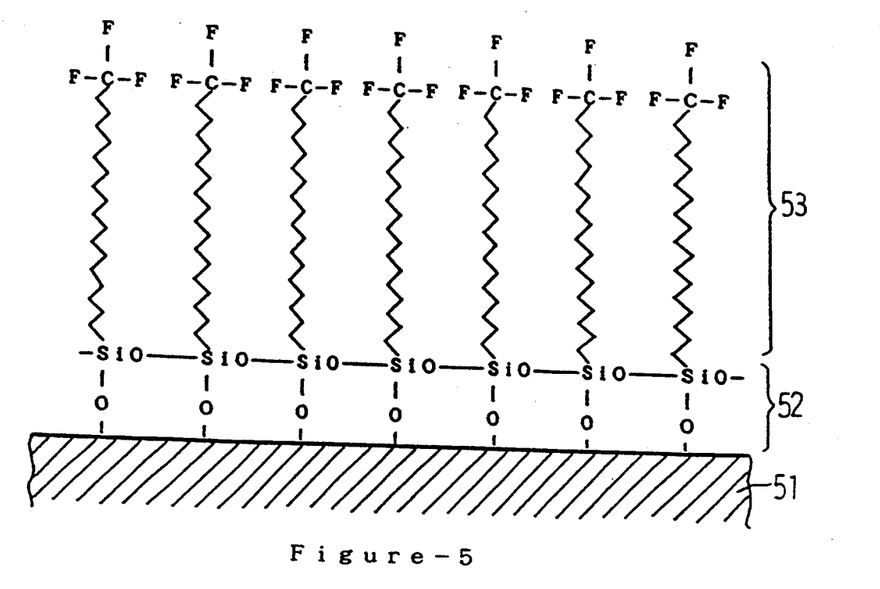
FIG. 5 is a sectional conceptual diagram magnifying the surface of a corona wire used in an electrophotographic apparatus of the invention from a molecular level.

A fifth embodiment of the electrophotographic apparatus of the invention comprises, as shown in FIG. 5, a corona wire 51 having its surface coated with monomolecular film 53 possessing a fluorocarbon group through a siloxane coupling 52.

As the material for the corona wire, metal, especially tungsten wire, coated with gold is used.

The chemical adsorption film applied on the surface of the corona wire of the electrophotographic apparatus of the invention is composed of a chlorosilane surface active agent possessing a fluorocarbon group.

Figure 6:
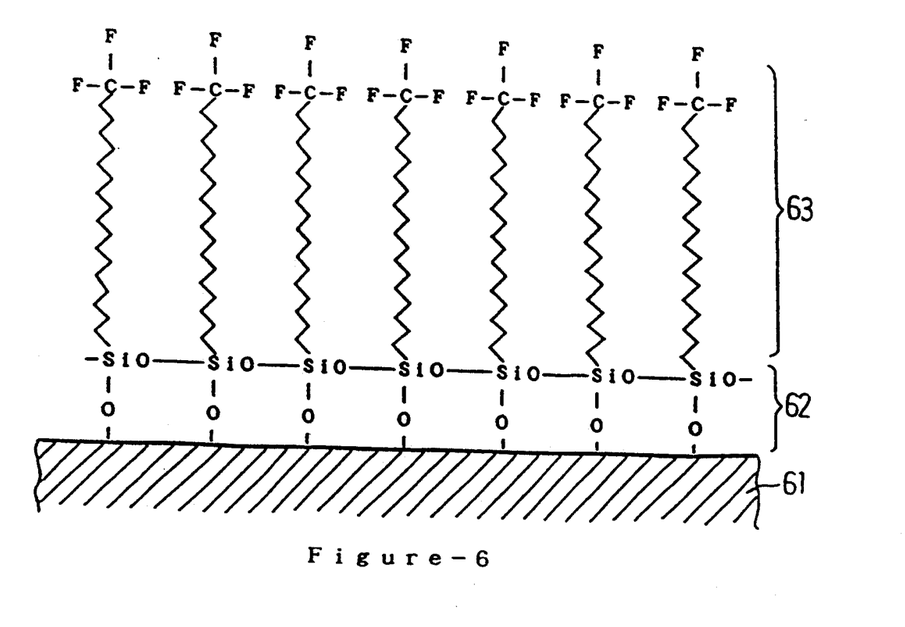
FIG. 6 is a sectional conceptual diagram magnifying the surface of a corona grid used in an electrophotographic apparatus of the invention from a molecular level.

A sixth embodiment of the electrophotographic apparatus of the invention comprises, as shown in FIG. 6, a corona grid 61 having its surface coated with a monomolecular film 63 possessing a fluorocarbon group through a siloxane coupling 62.

As the material for the charging grid, stainless steel is used in particular.

The chemical adsorption film applied on the surface of the corona grid used in the electrophotographic apparatus of the invention is composed of a chlorosilane surface active agent possessing a fluorocarbon group.

Examples of trichlorosilane-based surface active materials of the present invention include
$CF_3(CF_2)_7(CF_2)_2SiCl_3$,
$CF_3CH_2O(CH_2)_{15}SiCl_3$,
$CF_3(CH_2)_2Si(CH_3)_2(CH_2)_{15}SiCl_3$,
$F(CF_2)_4(CH_2)_2Si(CH_3)_2(CH_2)_9SiCl_3$,
$F(CF_2)_8(CH_2)_2Si(CH_3)_2(CH_2)_9SiCl_3$,
$F(CF_2)_8(CH_2)_2Si(CH_3)_2(CH_2)_{10}SiCl_3$,
$F(CF_2)_8(CH_2)_2Si(CH_3)_2(CH_2)_{16}SiCl_3$,
$CF_3COO(CH_2)_{15}SiCl_3$,
$CF_3(CF_2)_5(CH_2)_2SiCl_3$,
$CH_3(CH_2)_9SiCl_3$,
$CH_3CH_2O(CH_2)_{15}SiCl_3$,
$CH_3(CH_2)_2Si(CH_3)_2(CH_2)_{15}SiCl_3$,
$CH_3(CH_2)_6Si(CH_3)_2(CH_2)_9SiCl_3$,
$CH_3(CH_2)_{10}Si(CH_3)_2(CH_2)_9SiCl_3$,
$CH_3COO(CH_2)_{15}SiCl_3$.

Examples of lower-alkyl substituted monochlorosilane- or dichlorosilane-based surface active materials of the present invention include
$CF_3(CF_2)_7(CH_2)_2SiCl_n(CH_3)_{3-n}$,
$CF_3CH_2O(CH_2)_{15}SiCl_n(CH_3)_{3-n}$,
$CF_3(CF_2)_7(CH_2)_2SiCl_n(C_2H_5)_{3-n}$,
$CF_3(CH_2)_2Si(CH_3)_2(CH_2)_{15}SiCl_n(CH_3)_{3-n}$,
$CF_3CH_2O(CH_2)_{15}SiCl_n(C_2H_5)_{3-n}$,
$CF_3(CF_2)_3(CH_2)_2Si(CH_3)_2(CH_2)_9SiCl_n-(C_2H_5)_{3-n}$,
$CF_3(CF_2)_3(CH_2)_2Si(CH_3)_2(CH_2)_{10}SiCl_n-(C_2H_5)_{3-n}$,
$CF_3(CF_2)_3(CH_2)_2Si(CH_3)_2(CH_2)_{16}SiCl_n-(C_2H_5)_{3-n}$,
$CF_3(CF_2)_7(CH_2)_2Si(CH_3)_2(CH_2)_9SiCl_n-(CH_3)_{3-n}$,
$CF_3(CF_2)_5(CH_2)_2SiCl_n(CH_3)_{3-n}$,
$CF_3COO(CH_2)_{15}SiCl_n(CH_3)_{3-n}$
where n represents 1 or 2.

Among these examples, trichlorosilane-based surface active materials are preferred in that chlorosilyl bonds other than those bonded to their hydrophilic groups form inter-molecular bonds with adjacent chlorosilane groups by siloxane bonds, thereby permitting formation of a more firmly adsorbed film.

Trichlorosilane-based surface active materials are particularly preferred because chlorosilyl bonds other than those coupled to their hydrophilic groups form inter-molecular bonds with adjacent chlorosilane groups with siloxane bonds and thus permit formation of a more firmly adsorbed film.

Further, $CF_3(CF_2)_n(CH_2)_2SiCl_3$ where n represents an integer, most suitably 3 to 25, is preferred because of its solubility and its water-repelling, anti-contaminating and other functional properties. Further, with an ethylene (C=C) or acetylene (C≡C) group added to or incorporated in the fluorocarbon chain portion, the chemically adsorbed film may be crosslinked after formation by irradiating it with an electron beam of about 5 Mrads, thus further improving the hardness of the chemically adsorbed film.

It is thus possible to further improve the hardness of the chemically adsorbed film.

The chlorosilane-based surface active material capable of use according to the invention is not limited to those in the form of a straight chain as noted above. It is possible to use a branched fluorocarbon or hydrocarbon group or those having a substituted fluorocarbon or hydrocarbon group with silicon at one end (i.e., those represented by the formula $R_2SiCl_2$, $R_3SiCl$, $R^1R^2SiCl_2$ or $R^1R^2R^3SiCl$ where R, $R^1$, $R^2$ and $R^3$ represents an fluorocarbon group or hydrocarbon group). To increase the adsorption density, however, the straight chain form is preferred.

Further, by chemically adsorbing a material for forming an inner layer material having a plurality of chlorosilyl groups, e.g., $SiCl_4$, $SiHCl_3$, $SiH_2Cl_2$, and $Cl(SiCl_2O)_nCl_3$ (where n represents an integer in a range from 1 to 20), $SiCl_m(CH_3)_{4-m}$, $SiCl_m(C_2H_5)_{4-m}$ (where m represents 1, 2 or 3), and $HSiCl_p(CH_3)_{3-p}$, $HSiCl_p(C_2H_5)_{3-p}$ (where p represents 1 or 2), and then reacting it with water, surface chlorosilyl bonds are converted to hydrophilic silanol bonds, thus making the polymer composition hydrophilic. Among the materials containing a plurality of chlorosilyl groups, tetrachlorosilane ($SiCl_4$) is preferred in that it is highly reactive and low in molecular weight. It can, therefore, provide silanol bonds at a high density. In this way, it is possible to provide a highly hydrophilic composition compared to oxidation treatment of a polymer-containing substrate. To this surface, a chlorosilane-based surface active material containing fluorocarbon groups may be chemically adsorbed. In this way, a chemically adsorbed film suitably having an increased density can be obtained.

With a machine part consisting of a plastic molding, a chemically adsorbed film containing fluoroalkyl groups is formed on the plastic molding surface via siloxane bonds. The method of forming the film suitably comprises a step of making the plastic molding surface hydrophilic by oxidation treatment, and a step of chemically adsorbing a chlorosilane-based surface active material to the oxidized surface by contacting the surface with a non-aqueous organic solvent by means of dipping, thus forming a chemically adsorbed film containing fluoroalkyl groups via siloxane bonds.

The plastic material may be oxidized by ordinary means, e.g., oxygen plasma treatment, corona treatment, and dipping into a mixed solution containing concentrated sulfuric acid and potassium dichromate (i.e., a chromium-containing mixture solution treatment).

The non-aqueous solvent to be used according to the invention may be any organic solvent, which does not dissolve the plastic material with the chemically adsorbed film to be formed thereon and is free from active hydrogen able to react with the chlorosilane-based surface active material. Suitable examples of the solvent are fluorine-based solvents, e.g., 1,1-dichloro-1-fluoroethane, 1,1-dichloro-2,2,2-trifluoroethane, 1,1-dichloro-2,2,3,3,3-pentafluoropropane, 1,3-dichloro-1,1,2,2,3-heptafluoropropane, etc., hydrocarbon-based solvents, e.g., hexane, octane, hexadecane, cyclohexane, etc., ether-based solvents, e.g., dibutylether, dibenzylether, etc., and ester-based solvents, e.g., methyl acetate, ethyl acetate, isopropyl acetate, amyl acetate, etc.

Incidentally, the chemical adsorption film applied on the surface of the photoconductor, cleaning blade, fixing roller, separation pawl, corona wire and corona grid used in the electrophotographic apparatus of the invention sufficiently exhibits its desired advantages with only one layer of a monomolecular chemical adsorption film. To form only one layer of a monomolecular chemical adsorption film, after chemically adsorbing a substance containing a plurality of chlorosilyl groups or chlorosilane surface active agent, it is washed in a nonaqueous solvent without contact with moisture, and is then allowed to be contacted with moisture. It is therefore done easily without any particular process. Needless to say, the chemical adsorption film may be formed by accumulating monomolecular films. In this way, when the chemical adsorption film forms a monomolecular film, the groups showing the given function are oriented and the density is enhanced, so that added benefits may be exhibited. When forming a chemical adsorption polymer film, the step of washing in nonaqueous solvent is skipped.

The invention is further described below by referring to some of the practical embodiments.

Embodiment 1

On an aluminum cylinder support of 80 mm in diameter and 360 mm in length, 2 μm thick undercoat layer was disposed by applying a 5 wt. % methanol solution of nylon resin by a dipping method. On this undercoat layer, as a photoconductor layer, amorphous silicon was formed in a thickness of 0.3 μm by a sputtering method. The material was dipped and held in a $10^{-2}$ mol/liter cyclohexane solution of heptadecafluorodecyl trichlorosilane (surface active agent) for 120 minutes at room temperature in a nitrogen atmosphere, and successively the unreacted surface active agent was washed in a nonaqueous cyclohexane solution and then in pure water, and a chemical adsorption monomolecular film through a siloxane coupling containing a fluorocarbon group was formed on the surface of the photoconductor surface. In this process, if the formed film is not washed in a nonaqueous solution, a chemical adsorption polymer film will be formed.

Embodiment 2

On an aluminum cylinder support of 80 mm in diameter and 360 mm in length, a 2 μm thick undercoat layer was disposed by applying a 5% methanol solution of nylon resin by a dipping method.

To 88 parts of a mixed solvent of MEK (ethyl methyl ketone) and dichloromethane, 12 parts of a pyrazoline derivative and 10 parts of a bisphenyl A polycarbonate resin were dissolved. The solution was dipped and applied on the undercoat layer, and was dried by hot air for 1 hour at 100° C., and a 19 μm thick charge transfer layer was formed.

Having 10 parts of perylene pigment dissolved in a mixed solvent of bisphenol Z polycarbonate monochlorobenzne/dichloromethane=1:1 to make up 100 parts of solution (2% concentration by weight), the solution was dispersed in a ball mill for 24 hours. This dispersion was applied on the charge transfer layer, and by drying for 20 minutes at 100° C., a 2 μm thick charge generation layer was formed.

This photoconductor was treated in a UV dry stripper for 10 minutes with oxygen plasma (oxygen flow: 1 liter/min) to oxidize the surface, and it was dipped and held in a 1 wt. % tetrachlorosilane solution [solvent: tri(n-nonafluorobutyl) amine] for 60 minutes at room temperature in a nitrogen atmosphere, and in succession the unreacted tetrachlorosilane was washed in tri(n-nonafluorobutyl)amine, then in pure water, and using a dried sample, and using heptadecafluorodecyl trichlorosilane as a chlorosilane surface active agent containing a fluorocarbon group, it was dipped and held in tri(n-nonafluorobutyl)amine solution at a concentration of $10^{-2}$ mol/liter for 120 minutes at room temperature in a nitrogen atmosphere, and the unreacted heptadecafluorodecyl trichlorosilane was washed in a tri(n-nonafluorobutyl) amine solvent, then in pure water, thereby forming a chemical adsorption monomolecular film containing a fluorocarbon group through a siloxane coupling on the photoconductor surface.

Embodiment 3

A similar experiment was conducted by forming a mixture (30:70:30 by weight) of urethane resin, silicon resin and silica particles as a protective layer on the photoconductor layer in Embodiment 1.

Reference 1

The processing was same as in Embodiment 1, except that the step of forming the chemical adsorption film was skipped.

Reference 2

The processing was same as in Embodiment 2, except that the step of forming the chemical adsorption film was skipped.

The photoconductor obtained in Embodiments 1 to 3 and References 1 and 2 were installed in a commercial electrophotographic apparatus, and corona charging, image exposure, development by toner, transfer and cleaning were repeated 10,000 times at 25° C. and 55% RH, and images were produced. The quality of the image obtained after 10,000 times was evaluated, and the result is shown in Table 1.

Table 1

Image quality after 10,000 times

Embodiment 1 As high as initial quality
Reference 1 Sharpness extremely lowered, showing many black spots and white blank areas
Embodiment 2 As high as initial quality
Reference 2 Sharpness extremely lowered, showing blurry image, black spots, and white black areas
Embodiment 3 As high as initial quality As clear from Table 1, in the electrophotographic apparatus using the photoconductors of the reference examples, the image quality was extremely lowered when used repeatedly and continuously, but in the apparatus using the photoconductors of the invention, the image quality was not lowered after repeated continuous use.

Embodiment 4

Polyurethane rubber of 50 mm in length, 360 mm in width and 3 mm in thickness was dipped and held for 120 minutes in a $10^{-2}$ mol/liter cyclohexane solution of heptadecafluorodecyl trichlorosilane at room temperature in a nitrogen atmosphere, and the unreacted heptadecafluorodecyl trichlorosilane was washed in cyclohexane, then in pure water, and a chemical adsorption monomolecular film containing fluorocarbon group through a siloxane coupling was formed on the surface of the cleaning blade.

Embodiment 5

Polyurethane rubber of 50 mm in length, 360 mm in width and 3 mm in thickness was treated in a UV dry stripper for 10 minutes with oxygen plasma (oxygen flow rate: 1 liter/min) to oxidize the surface, and it was dipped and held in 1 wt. % tetrachlorosilane solution [solvent: tri(n-nonafluorobutyl)amine] for 60 minutes at room temperature in a nitrogen atmosphere, and the unreacted tetrachlorosilane was washed in tri(n-nonafluorobutyl)amine, then in pure water, and using the dried sample, and using heptadecafluorodecyl trichlorosilane as the chlorosilane surface active agent containing fluorocarbon group, it was dipped and held in a tri(n-nonafluorobutyl)amine solution at a concentration of $10^{-2}$ mol/liter for 120 minutes at room temperature in a nitrogen atmosphere, and successively the unreacted heptadecafluorodecyl trichlorosilane was washed in a tri(n-nonafluorobutyl)amine solvent, then in pure water. A chemical adsorption monomolecular film containing fluorocarbon groups through siloxane coupling was formed on the surface of the cleaning blade.

Embodiment 6

A similar experiment was done to Embodiment 4, except that heptadecafluorodecyl trichlorosilane was replaced by 9-(heptadecafluorodecyl dimethylsilyl) nonyltrichlorosilane.

Reference 3

Same as in Embodiment 4, except that the step for forming the chemical adsorption film was skipped.

The cleaning blades of Embodiments 4 to 6 and Reference 3 were installed in a commercial electrophotographic apparatus, and corona charging, image exposure, development by toner, transfer and cleaning were repeated 10,000 times at 25° C. and 55% RH, and images were reproduced. The quality of the images obtained after 10,000 times was evaluated, and the result is shown in Table 2.

Table 2

Image quality after 10,000 times

Embodiment 4 As high as initial quality
Embodiment 5 As high as initial quality
Embodiment 6 As high as initial quality
Reference 3 Sharpness extremely lowered, showing blurry image, black spots As clear from Table 2, in the electrophotographic apparatus using the cleaning blade of the reference example, the image quality was extremely lowered after repeated and continuous use, but in the electrophotographic apparatus using the cleaning blade of the invention, the image quality was not lowered after repeated use.

Embodiment 7

An aluminum roller of 30 mm in diameter and 360 mm in length was dipped and held in $10^{-2}$ mol/liter cyclohexane solution of heptadecafluorodecyl trichlorosilane for 120 minutes at room temperature in nitrogen atmosphere, and the unreacted heptadecafluorodecyl trichlorosilane was washed in cyclohexane, then in pure water, and a chemical adsorption monomolecular film containing fluorocarbon groups through siloxane coupling was formed on the surface of the fixing roller.

Embodiment 8

The same aluminum roller as in Embodiment 7 was first dipped and held in a 1 wt. % tetrachlorosilane solution [solvent: tri(n-nonafluorobutyl)amine] for 60 minutes at room temperature in a nitrogen atmosphere, and the unreacted tetrachlorosilane was washed in tri(n-nonafluorobutyl)amine, then in pure water, and using the dried sample and using heptadecafluorodecyl trichlorosilane as the chlorosilane surface active agent containing fluorocarbon groups, it was dipped and held in tri(n-nonafluorobutyl)amine solution at a concentration of $10^{-2}$ mol/liter for 120 minutes at room temperature in a nitrogen atmosphere, and the unreacted heptadecafluorodecyl trichlorosilane was washed in a tri(n-nonafluorobutyl)amine solvent, then in pure water, and a chemical adsorption monomolecular film containing fluorocarbon groups through siloxane coupling was formed on the surface of the fixing roller.

Embodiment 9

An experiment was conducted the same as in Embodiment 7, except that heptadecafluorodecyl trichlorosilane was replaced by 9-(heptadecafluorodecyl dimethylsilyl) nonyltrichlorosilane.

Reference 4

An experiment was conducted the same as in Embodiment 7, except that a coating film of polytetrafuloroethylene was formed at a thickness of 10 µm, instead of forming the chemical adsorption film.

The fixing rollers of Embodiments 7 to 9 and Reference 4 were installed in the fixing unit of the commercial electrophotographic apparatus, and corona charging, image exposure, development by toner, transfer, fixing and cleaning were repeated 10,000 times at 25° C. and 55% RH, and images were reproduced. The quality of the image obtained after 10,000 times was evaluated, and the result is shown in Table 3.

Table 3

Image quality after 10,000 times

Embodiment 7 As high as initial quality
Embodiment 8 As high as initial quality
Embodiment 9 As high as initial quality
Reference 4 Sharpness lowered, showing partly black spots As clear from Table 3, in the electrophotographic apparatus using the fixing roller of the reference example, the image quality was lowered by repeated and continuous use, but in the electrophotographic apparatus using the fixing roller of the invention, the image quality was not lowered by repeated and continuous use.

Embodiment 10

Figure 7:
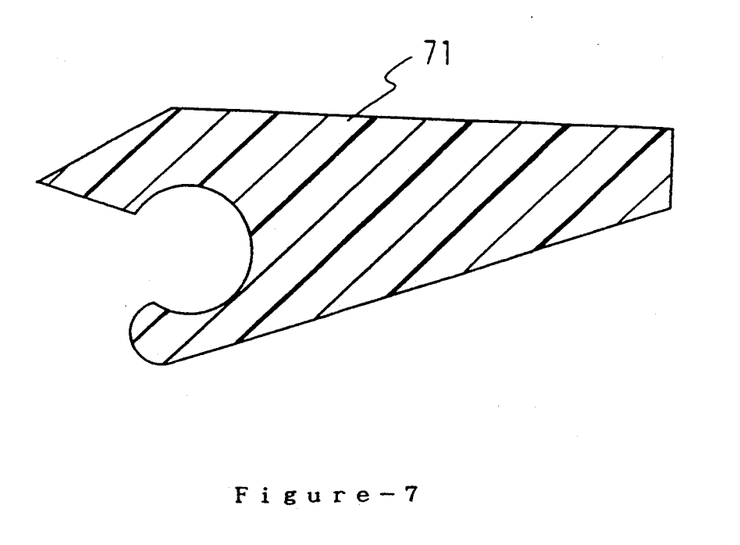
FIG. 7 is a sectional view of a separation pawl used in an electrophotographic apparatus of the invention.

A block of core material of a separation pawl in a shape as shown in FIG. 7 was obtained from polyamide imide by cutting or injection forming. This molding was dipped and held in a $10^{-2}$ mol/liter cyclohexane solution of heptadecafluorodecyl trichlorosilane for 120 minutes at room temperature in a nitrogen atmosphere, and the unreacted heptadecafluorodecyl trichlorosilane was washed in cyclohexane, then in pure water, and a chemical adsorption film containing fluorocarbon groups through siloxane coupling was formed on the surface of the separation pawl.

Embodiment 11

The same separation pawl as in Embodiment 10 was dipped and held in 1 wt. % tetrachlorosilane solution [solvent: tri(n-nonafluorobutyl)amine] for 60 minutes at room temperature in a nitrogen atmosphere, and the unreacted tetrachlorosilane was successively washed in tri(n-nonafluorobutyl)amine, then in pure water, and using the dried sample, and using heptadecafluorodecyl trichlorosilane as the chlorosilane surface active agent containing alkyl fluoride groups, it was dipped and held in a tri(n-nonafluorobutyl)amine solution at a concentration of $10^{-2}$ mol/liter for 120 minutes at room temperature in a nitrogen atmosphere, and successively the unreacted heptadecafluorodecyl trichlorosilane was washed in a tri(n-nonafluorobutyl)amine solvent, then in pure water, and a chemical adsorption monomolecular film containing fluorocarbon groups through siloxane coupling was formed on the surface of the separation pawl.

Embodiment 12

An experiment was conducted the same as in Embodiment 10, except that heptadecafluorodecyl trichlorosilane was replaced by 9-(heptadecafluorodecyl dimethylsilyl) nonlyltrichlorosilane.

Reference 5

An experiment was conducted the same as in Embodiment 10, except that a coating film of Teflon ("Teflon" is the trademark for polytetrafluoroethylene) was formed at a thickness of 10 μm instead of forming the chemical adsorption film.

The separation pawls of Embodiments 10 to 12 and Reference 5 were installed in the fixing unit of the commercial electrophotographic apparatus, and corona charging, image imposture, development by toner, transfer, fixing and cleaning were repeated 10,000 times at 25° C. and 55% RH, and the images were reproduced. The quality of the images obtained after 10,000 times was evaluated, and the result is shown in Table 4.

Table 4

Image quality after 10,000 times

Embodiment 10 As high as initial quality
Embodiment 11 As high as initial quality
Embodiment 12 As high as initial quality
Reference 5 White spots seen in separation pawl fixing portion.

As clear from Table 4, in the electrophotographic apparatus using the separation pawl of the reference example, the image quality was lowered by repeated and continuous use, but in the electrophotographic apparatus using the separation pawl of the invention, the image quality was not lowered after repeated and continuous use.

Embodiment 13

A tungsten wire of 50 μm in diameter and 360 mm in length was dipped and held in a $10^{-2}$ mol/liter cyclohexane solution of heptadecafluorodecyl trichlorosilane for 120 minutes at room temperature in a nitrogen atmosphere, and the unreacted heptadecafluorodecyl trichlorosilane was successively washed in cyclohexane, then in pure water, and a chemical adsorption monomolecular film containing fluorocarbon groups through siloxane coupling was formed on the surface of the corona wire.

Embodiment 14

The same tungsten wire as in Embodiment 13 was first dipped and held in a 1 wt. % tetrachlorosilane solution [solvent: tri(n-nonafluorobutyl)amine] for 60 minutes at room temperature in a nitrogen atmosphere, and the unreacted tetrachlorosilane was washed in tri(n-nonafluorobutyl)amine, then in pure water, and using the dried sample, and using heptadecafluorodecyl trichlorosilane as the chlorosilane surface active agent containing fluorocarbon groups, it was dipped and held in a tri(n-nonafluorobutyl)amine solution at a concentration of $10^{-2}$ mol/liter for 120 minutes at room temperature in a nitrogen atmosphere, and the unreacted heptadecafluorodecyl trichlorosilane was washed in a tri(n-nonafluorobutyl)amine solvent, then in pure water, and a chemical adsorption monomolecular film containing fluorocarbon groups through siloxane coupling was formed on the corona wire.

Embodiment 15

An experiment was done the same as in Embodiment 13, except that heptadecafluorodecyl trichlorosilane was replaced by 9-(heptadecafluorodecyl dimethylsilyl)nonyltrichlorosilane.

Reference 6

The corona wire in Embodiment 13 was used as reference example without surface treatment.

The corona wires of Embodiments 13 to 15 and Reference 6 were installed in the fixing unit of the commercial electrophotographic apparatus, and corona charging, image exposure, development by toner, transfer, fixing and cleaning were repeated 10,000 times at 25° C. and 55% RH, and the images were reproduced. The quality of the images obtained after 10,000 times was evaluated, and the result is shown in Table 5.

Table 5

Image quality after 10,000 times

Embodiment 13 As high as initial quality
Embodiment 14 As high as initial quality
Embodiment 15 As high as initial quality
Reference 6 Sharpness lowered, showing black spots partially As clear from Table 5, in the electrophotographic apparatus using the corona wire of the reference example, the image quality was lowered by continuous and repeated use, but in the electrophotographic apparatus using the corona wire of the invention, the image quality was not lowered after repeated and continuous use.

Embodiment 16

A stainless steel corona grid of 1.5 cm in width and 360 mm in length was dipped and held in a $10^{-2}$ mol/liter cyclohexane solution of heptadecafluorodecyl trichlorosilane for 120 minutes at room temperature in a nitrogen atmosphere, and the unreacted heptadecafluorodecyl trichlorosilane was successively washed in cyclohexane, then in pure water, and a chemical adsorption monomolecular film containing fluorocarbon groups through siloxane coupling was formed on the surface of the corona grid.

Embodiment 17

The same stainless steel grid as in Embodiment 16 was first dipped and held in a 1 wt. % tetrachlorosilane solution [solvent: tri(n-nonafluorobutyl)amine] for 60 minutes at room temperature in a nitrogen atmosphere, and the unreacted tetrachlorosilane was washed in tri(n-nonafluorobutyl)amine, then in pure water, and using the dried sample, and using heptadecafluorodecyl trichlorosilane as chlorosilane surface active agent containing fluorocarbon group, it was dipped and held in a tri(n-nonafluorobutyl)amine solution at a concentration of $10^{-2}$ mol/liter for 120 minutes at room temperature in a nitrogen atmosphere, and the unreacted heptadecafluorodecyl trichlorosilane was washed in a tri(n-nonafluorobutyl)amine solvent, the in pure water, and chemical adsorption film containing fluorocarbon groups through siloxane coupling was formed on the corona grid.

Embodiment 18

An experiment was conducted the same as in Embodiment 16, except that heptadecafluorodecyl trichlorosilane was replaced by 9-(heptadecafluorodecyl dimethylsilyl) nonyltrichlorosilane.

Reference 7

The corona grid of Embodiment 16 was used as a reference example without surface treatment.

The corona grid of Embodiments 16 to 18 and Reference 7 were installed in the fixing unit of the commercial electrophotographic apparatus, and corona charging, image exposure, development by toner, transfer, fixing and cleaning were repeated 10,000 times at 25° C.

and 55% RH, and the images were reproduced. The quality of images after 10,000 times was evaluated, and the result is shown in Table 6.

Table 6

Image quality after 10,000 times

Embodiment 16 As high as initial quality
Embodiment 17 As high as initial quality
Embodiment 18 As high as initial quality
Reference 7 Sharpness lowered, showing black spots partially As clear from Table 6, in the electrophotographic apparatus using the corona grid of the reference example, the image quality was lowered after repeated and continuous use, but in the electrophotographic apparatus using the corona grid of the invention, the image quality was not lowered after repeated and continuous use.

The electrophotographic apparatus of the first embodiment has the surface of the electrophotographic photoconductor covalently bonded with a monomolecular film containing a fluorocarbon group through siloxane coupling, so that the photoreceptor excellent in anti-fouling property and durability may be obtained.

Besides, since the surface of the photoconductor is covered with a chemical adsorption film containing a fluorocarbon film through siloxane coupling, as compared with the prior art, the anti-fouling property is outstanding. As a result, if used continuously, images of high quality are obtained.

The electrophotographic apparatus of the second embodiment has the surface of the cleaning blade coated with a chemical adsorption film containing a fluorocarbon film through siloxane coupling, and therefore as compared with the prior art, the lubrication and anti-fouling properties are notably excellent. As a result, images of high quality are obtained if used continuously.

The electrophotographic apparatus of the third embodiment has the surface of the fixing roller coated with a chemical adsorption film containing a fluorocarbon group through siloxane coupling, and therefore as compared with the prior art, the anti-fouling property is excellent. As a result, if used continuously, images of high quality are obtained.

The electrophotographic apparatus of the fourth embodiment has the surface of the separation pawl coated with a chemical adsorption film containing a fluorocarbon group through siloxane coupling, and therefore the parting property is superb as compared with the prior art. As a result, if used continuously, images of high quality are obtained.

The electrophotographic apparatus of the fifth embodiment has the surface of the corona wire coated with a chemical adsorption film containing a fluorocarbon group through siloxane coupling, and therefore the toner parting property is superb as compared with the prior art. As a result, if used continuously, images of high quality are obtained.

The electrophotographic apparatus of the sixth embodiment has the surface of the corona grid coated with a chemical adsorption film containing an alkyl fluoride group through siloxane coupling, and therefore the toner parting property is superb as compared with the prior art. As a result, if used continuously, images of high quality are obtained.

Thus, the invention brings about outstanding industrial uses.

As has been shown, the invention is greatly beneficial to industry.

The invention may be embodied in other specific forms without departing from the spirit or essential characteristics thereof. The present embodiment is to be considered in all respects as illustrative and not restrictive, the scope of the invention being indicated by the appended claims rather than by the foregoing description and all changes which come within the meaning and range of equivalency of the claims are intended to be embraced therein.

What is claimed is:

1. An electrophotographic apparatus for obtaining duplicate images comprising a photoimaging component coated with a chemical adsorption film containing a fluorocarbon group, said chemical adsorption film bonded directly to the photoimaging component through —SiO— covalent bonds.

2. The electrophotographic apparatus according to claim 1, wherein said component is selected from the group consisting of a photoconductor, cleaning blade, fixing roller, separation pawl, corona wire and corona grid.

3. The electrophotographic apparatus according to claim 1, wherein said chemical adsorption film is a monomolecular film or a polymer film.

4. The electrophotographic apparatus according to claim 1, wherein said component comprises a substrate made of a material selected from the group consisting of metals, metal oxide, ceramics, glass, plastics.

5. The electrophotographic apparatus according to claim 1, wherein said component comprises a substrate surface having at least one functional group selected from the group consisting of a hydroxyl group, carboxyl group, an imino group and an amino group.

6. The electrophotographic apparatus according to claim 1, wherein said component comprises a plasma or corona treated substrate surface.

7. The electrophotographic apparatus according to claim 1 or 3, wherein said chemical adsorption film is laminated via a siloxane-based inner layer, said inner layer being bonded by covalent bonds to a surface of the device, said inner layer and said chemical adsorption film being bonded together by covalent bonds.

8. The electrophotographic apparatus according to claim 7, wherein said inner layer is a monomolecular film or polymer film.

9. An electrophotographic apparatus for obtaining duplicate images comprising a photoimaging component coated with a chemical adsorption film containing a fluorocarbon group, wherein the chemical adsorption film is bonded directly to the photoimaging component through —SiO— covalent bonds, and wherein the chemical adsorption film is a fluorocarbon chain represented by the formula:

$$XYSiCl_n$$

wherein X is selected from the group consisting of $CF_3$ and $CH_3$; Y is a fluorocarbon or hydrocarbon chain; and n is 3, 2 or 1.

10. The electrophotographic apparatus of claim 9, wherein an additional hydrocarbon chain is covalently bonded to the $SiCl_n$ group.

11. The electrophotographic apparatus of claim 10, wherein:

X is $CF_3$;

Y is $(CF_2)_p (CH_2)_2$;

wherein p is an integer preferably between 3 and 25; and n is 3.

12. The apparatus of claim 10, wherein the additional hydrocarbon chain is branched.

13. An electrophotographic apparatus for obtaining duplicate images comprising a photoimaging component coated with a chemical adsorption film containing a fluorocarbon group, wherein the chemical adsorption film is bonded directly to the photoimaging component through —SiO— covalent bonds, further wherein the chemical adsorption film is a fluorocarbon chain represented by the formula:

$R_3SiCl$; $R_1R_2SiCl_2$; or $R_1R_2R_3SiCl$, wherein R, $R_1$, $R_2$, and $R_3$ represent fluorocarbon or hydrocarbon groups.

14. The apparatus of claim 13, wherein the $R_1$, $R_2$, and $R_3$ groups are straight-chained.

* * * * *